United States Patent [19]

Bailey et al.

[11] Patent Number: 5,448,430
[45] Date of Patent: Sep. 5, 1995

[54] TRACK FOLLOWING SERVO DEMODULATION

[75] Inventors: James A. Bailey, Tucson, Ariz.; James F. Crossland, Boulder, Colo.; James E. Malmberg, Tucson, Ariz.; Yogesh B. Patel, Tucson; Maxey P. Von Senden, Tucson, Ariz.

[73] Assignee: International Business Machines Corporation, Armonk, N.Y.

[21] Appl. No.: 102,368

[22] Filed: Aug. 5, 1993

[51] Int. Cl.[6] .......................... g11B 5/584; g11B 5/55
[52] U.S. Cl. ........................ 360/77.12; 360/78.02; 360/77.01
[58] Field of Search ............ 360/77.12, 77.06, 77.05, 360/77.11, 77.01, 751, 78.02, 78.11

[56] References Cited

U.S. PATENT DOCUMENTS

| | | | |
|---|---|---|---|
| 3,893,180 | 7/1975 | Braun et al. | 360/77.05 |
| 4,454,549 | 6/1984 | Pennington | 360/77 |
| 4,488,187 | 12/1984 | Alaimo | 360/77 |
| 4,546,395 | 10/1985 | Sellars | 360/77.12 |
| 4,575,775 | 3/1986 | Albrecht | 360/77 |
| 5,121,270 | 6/1992 | Alcudia et al. | 360/77.12 |
| 5,229,895 | 7/1993 | Schwarz et al. | 360/77.12 |
| 5,262,908 | 11/1993 | Iwamatsu et al. | 360/77.12 |

Primary Examiner—Aristotelis Psitos
Assistant Examiner—Varsha A. Kapadia
Attorney, Agent, or Firm—D. A. Shifrin

[57] ABSTRACT

The present invention provides an apparatus and method for precise servo tracking of a multi-track magnetic tape head. The magnetic tape has at least one servo area with at least two servo tracks. Adjoining servo tracks have different servo patterns recorded thereon, one being a single frequency, constant amplitude signal, the other alternating between a zero amplitude null signal and a constant amplitude signal of a second frequency. A servo element in the tape head senses and combines the signals from both of the tracks. A detector outputs the peak-to-peak amplitude values of the combined signal and two register modules detect and store the maximum and minimum peak-to-peak values over a predetermined period of time. These maximum and minimum values are provided to a signal processor which determines their ratio. The ratio indicates the amount and direction of any position error of the servo element relative to the edge between the two adjacent servo tracks and is used to direct an actuator to adjust the position of the tape head to minimize the error.

7 Claims, 7 Drawing Sheets

| HEAD TRACK NO. | HEAD MODULE | |
|---|---|---|
| | L | R |
| 1 | WR | RD |
| 2 | RD | WR |
| 3 | WR | RD |
| 4 | RD | WR |
| 5 | WR | RD |
| 6 | RD | WR |
| 7 | WR | RD |
| 8 | RD | WR |
| SERVO | LS1 | RS1 |
| SERVO | LS2 | RS2 |
| 9 | WR | RD |
| 10 | RD | WR |
| 11 | WR | RD |
| 12 | RD | WR |
| 13 | WR | RD |
| 14 | RD | WR |
| 15 | WR | RD |
| 16 | RD | WR |
| SERVO | LS3 | RS3 |
| SERVO | LS4 | RS4 |
| 17 | WR | RD |
| 18 | RD | WR |
| 19 | WR | RD |
| 20 | RD | WR |
| 21 | WR | RD |
| 22 | RD | WR |
| 23 | WR | RD |
| 24 | RD | WR |
| SERVO | LS5 | RS5 |
| SERVO | LS6 | RS6 |
| 25 | WR | RD |
| 26 | RD | WR |
| 27 | WR | RD |
| 28 | RD | WR |
| 29 | WR | RD |
| 30 | RD | WR |
| 31 | WR | RD |
| 32 | RD | WR |

TRACK FOLLOWING SERVO DEMODULATION

TECHNICAL FIELD OF THE INVENTION

The present invention relates to magnetic tape data storage and, in particular, to the demodulation of a track following servo pattern recorded onto magnetic tape.

BACKGROUND OF THE INVENTION

In the information storage industry, increases in the data capacity of tape have been achieved with thinner tape substrates and with various data compression techniques. Advances in the magnetic tape media and tape head technologies have generated further increases in data capacity by increasing both the number of tracks on a magnetic tape (by narrowing the width of each track) and the number of data read/write "gaps" or elements on the head. For example, the IBM 3490-E magnetic tape subsystem for 12.7 mm (½ inch) wide tape employs a head with 36 data read/write elements and has a tape capacity of about 800 megabytes (MB). 3490-E tape drives perform serpentine (bi-directional) linear (as opposed to helical scan) recording and, to reduce the number of tape rewinds and thereby improve performance, sets of data head elements are interleaved. In an interleaved head, element pairs having a read-element/write-element configuration (when viewed toward the face of the head) alternate transversely across the tape path with element pairs having an opposite, write-element/read-element configuration, each pair of elements being associated with one track on the tape at any one point in time. When the tape travels in one direction, the element pairs having one configuration access the associated tracks (such as the even numbered tracks) in a read-after-write manner and when the tape travels in the opposite direction, the element pairs having the other configuration access the other associated tracks (the odd numbered tracks), also in a read-after-write manner. To further enhance performance with such a large number of tracks requiring an equally large number of closely spaced elements, a magneto-resistive transducer formed through thin film deposition techniques can be employed as the tape head.

However, the number of parallel, longitudinal tracks which can be established on tape media has been limited by the number of read/write elements which could be fabricated on a head to write/read narrower tracks. Therefore, data tape drives have been designed to process a tape using a head having fewer sets of read/write elements than there are tracks on the tape. The tracks are divided into groups, each containing the same number of tracks as there are read/write element pairs in the head. To access all of the groups, the head is indexed transversely relative to the tape width, such as with a stepper motor or voice coil driven springs, into a number of discrete positions corresponding to the number of groups of tracks. For example, a head having eight read/write pairs can accommodate a tape having 24 tracks if the tracks are divided into three groups of eight tracks each and the head has three index positions. To reduce the distance the head travels between index positions, the groups are preferably interleaved. In the preceding example, each of three groups contained eight tracks. If tracks are numbered consecutively (0–23), group interleaving results in tracks 0, 3, 6, . . . , and 21 being in the first group and accessible by the head being indexed to position 0. Similarly, tracks 1, 4, 7, . . . and 22 are in the second group, accessible in index position 1, while tracks 2, 5, 8, . . . and 23 are in the third group, accessible in index position 2. Serpentine recording techniques can also be employed to improve access efficiency.

Despite such advances in data capacity, still further increases are desired, such as would be possible with a 12.7 mm wide tape having 64 or even 128 tracks. However, even when a head is indexed, there is a practical limit to the ability of a multi-track head to accurately and reliably record data to and read data from a tape having such a large number of very narrow tracks. Problems can be caused by track misregistrations, such as tape edge variations, environmental thermal expansion and contraction and inaccuracies in the path the tape follows in a drive, by inaccuracies in the formatting of tracks on the tape itself and by dimensional and spacing deviations during the manufacturing of the head. It can be appreciated that even a minute "wobble" in the tape or a misalignment in the head can result in significant signal degradation, such as crosstalk and dropout, if a 12.7 mm tape has 128 tracks, each with a width of about 80 microns. Consequently, a tape head actuator has been developed which is capable of indexing a tape head to one of several positions during track seek operations. For example, to access a tape having 128 data tracks, a head having thirty-two read/write elements on the head indexes among four positions. Moreover, the head actuator is also capable of rapidly adjusting the position of the head under servo control to precisely follow a set of tracks during read and write operations. In a drive employing such actuator, the tape head has servo read elements for reading servo signals previously recorded onto one or more specially recorded servo tracks. Each servo element generates a position error signal (PES) which is employed by a position servo loop to determine the transverse position of the servo elements relative to the servo tracks. The loop then transmits a signal to the head actuator to rapidly move the head by very small amounts as necessary to enable precise track following.

To improve the accuracy with which the servo loop operates, the tape can have one or more servo areas, each comprising a set of one or more servo tracks, spaced across the width of the tape; the tape head has a corresponding number of sets of servo elements. If two or more servo areas and associated servo elements are employed, the PES's generated by the servo elements are concurrently read and averaged. The head position is maintained by the servo loop in response to the average, rather than the PES from any one servo element. Such redundancy makes the servo loop less susceptible to error or failure due to an error or failure of any one servo element. One such system includes three symmetrically spaced servo areas, each having three adjacent servo tracks, parallel to the data tracks. In each servo area, servo signals are recorded on the outer two (upper and lower) servo tracks at one frequency while servo signals are recorded on the middle servo track at a different frequency.

To provide for four head index positions, each set of servo elements has transversely spaced upper and lower servo elements, one of which is active at one time. During indexing, either the upper or lower servo element of each set of servo elements is positioned opposite the upper or lower boundary or edge between the middle servo track and the upper or lower servo track. Then, during data access, the servo loop attempts to maintain the magnetic center of the active servo elements in alignment with the selected upper or lower edge in the respective servo areas. It will be appreciated that the combination of two groups of servo elements (upper and lower) and two servo edges (upper and lower) makes the four index positions available and that other combinations provide other numbers of index positions.

One technique for track following employs dedicated servo elements in the tape transducer to read a servo pattern recorded on dedicated tracks on the magnetic tape. However, due to tape tension adjustments, tape slippage and other such occurrences, the velocity of the tape as it travels past the transducer is not constant but may experience variations sufficiently large to cause significant errors in frequency sensitive circuits. Therefore, satisfactory servoing techniques should be insensitive to significant velocity variations in its ability to extract track following servo information from the tape.

OBJECTS AND SUMMARY OF THE INVENTION

In view of the foregoing, it is an object of the present invention to provide precise servo tracking in a magnetic tape drive despite significant tape velocity variations.

It is a further object to provide precise servo tracking with no additional analog circuitry beyond that needed for reading and recording data and only a nominal amount of specialized logic circuitry.

These and other objects are achieved in this invention by providing an apparatus and method for generating a signal indicative of a position of a magnetic tape head relative to a magnetic tape having a periodic servo signal recorded thereon. Peak values of the servo signal are measured during a period of time and the maximum and minimum peak values detected. A ratio of the maximum and minimum values is calculated and a signal, such as a position error signal, is generated based upon the ratio. Preferably, the servo signal comprises separate signals with different servo patterns recorded on two adjoining servo tracks, one being a single frequency, constant amplitude signal, the other alternating between a zero amplitude null signal and a constant amplitude signal of a second frequency. A servo element in the tape head senses and combines the signals from both of the tracks. A detector outputs the peak-to-peak amplitude values of the combined signal and two register modules detect and store the maximum and minimum peak-to-peak values over a predetermined period of time. These maximum and minimum values are provided to a signal processor to determine their ratio which is indicative of the position of the servo element relative to the edge between the two servo tracks.

The foregoing and other features and advantages of the invention will be apparent from the following more particular description of preferred embodiments of the invention, as illustrated in the accompanying drawings.

RELATED APPLICATIONS

This application is related to the following copending U.S. Patent Applications, all having a common assignee with this application: Ser. No. 08/087,035, filed Jun. 30, 1993 and entitled DIGITAL PEAK THRESHOLD TRACKING METHOD AND APPARATUS by Bailey, et al.; Ser. No. 08/075,624, filed Jun. 14, 1993 and entitled PROCESSING SERVO SIGNALS CONCURRENTLY READ FROM PLURAL SPACED-APART SERVO AREAS FOR MAGNETIC TAPE HAVING SERPENTINE DATA TRACK SCANNING by Baca, et al.; and Ser. No. 08/075,937, filed Jun. 14, 1993 and entitled ACTUATOR ASSEMBLY FOR SERVO-CONTROLLED MAGNETIC TAPE HEAD by Hu, et al.

DETAILED DESCRIPTION OF THE INVENTION

Figure 1:
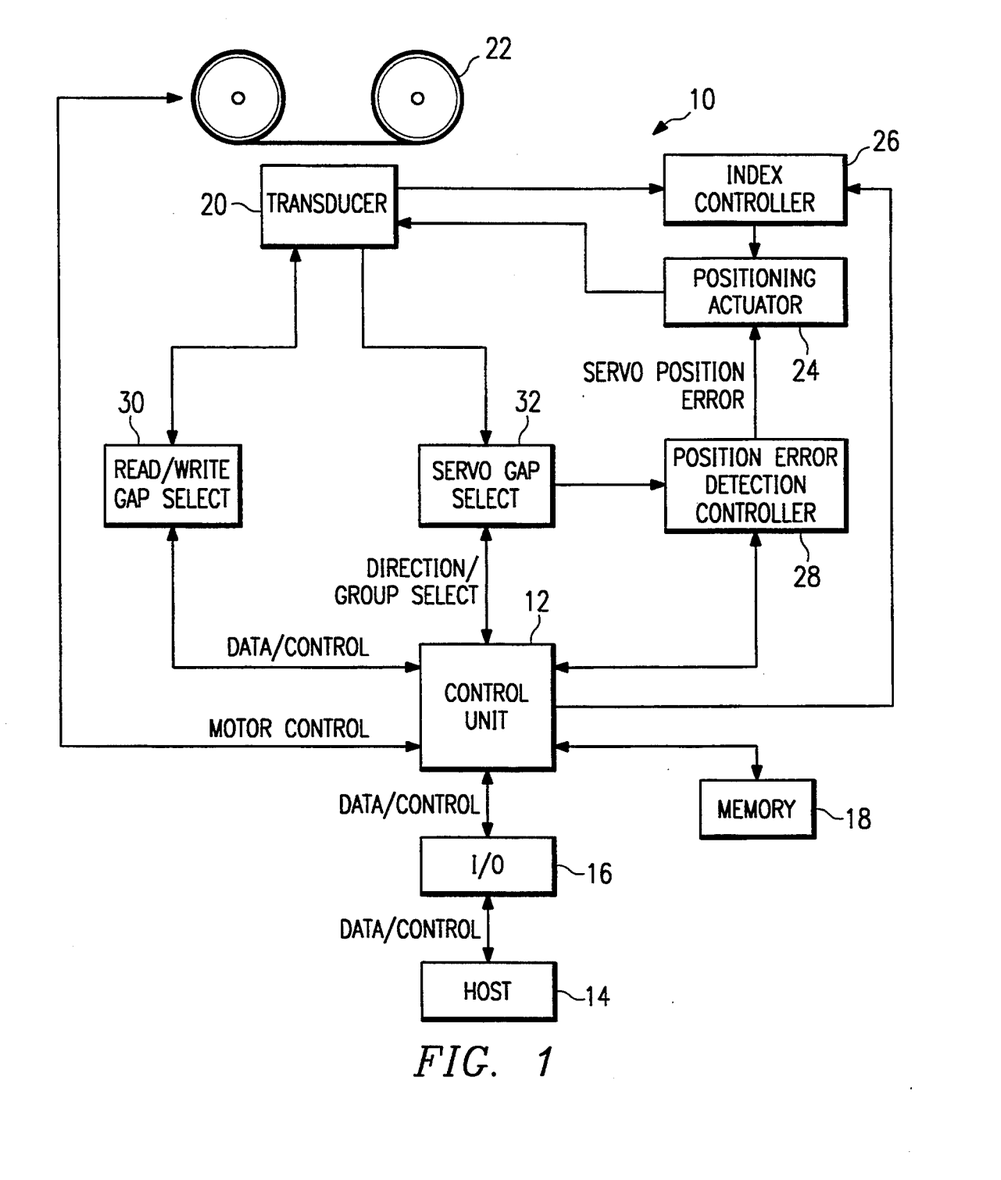
FIG. 1 is a block diagram of a magnetic tape system employing the present invention.

FIG. 1 is a block diagram of a magnetic tape system 10 of the present invention. The system 10 includes a control unit 12 to and from which data and control signals are transmitted from and to a host device 14 through an interface 16. The control unit 12 is interconnected with a memory device 18, such as random access memory, for storage of, among others, calibration information as later described herein. A magnetic tape head 20, such as a thin-film magneto-resistive transducer, includes both data read/write elements to record and read data onto and from a tape 22, and servo read elements to read servo signals recorded on the tape 22. The control unit 12 is interconnected with tape reel motors and tachometers to control the direction, velocity and acceleration of the tape 22. A positioning actuator 24 directs the motion of the transducer 20 in a transverse direction relative to the tape width. When the transducer 20 is to be moved to a selected index position, an index controller 26 is enabled by the control unit 12 and transmits an appropriate signal to the positioning actuator 24. Signals from a sensor, such as an optical encoder adjacent the transducer 20, provide feedback to the index controller 26 to ensure satisfactory index positioning. Similarly, a position error controller 28 directs the positioning actuator 24 during servo controlled track following.

Figure 2:
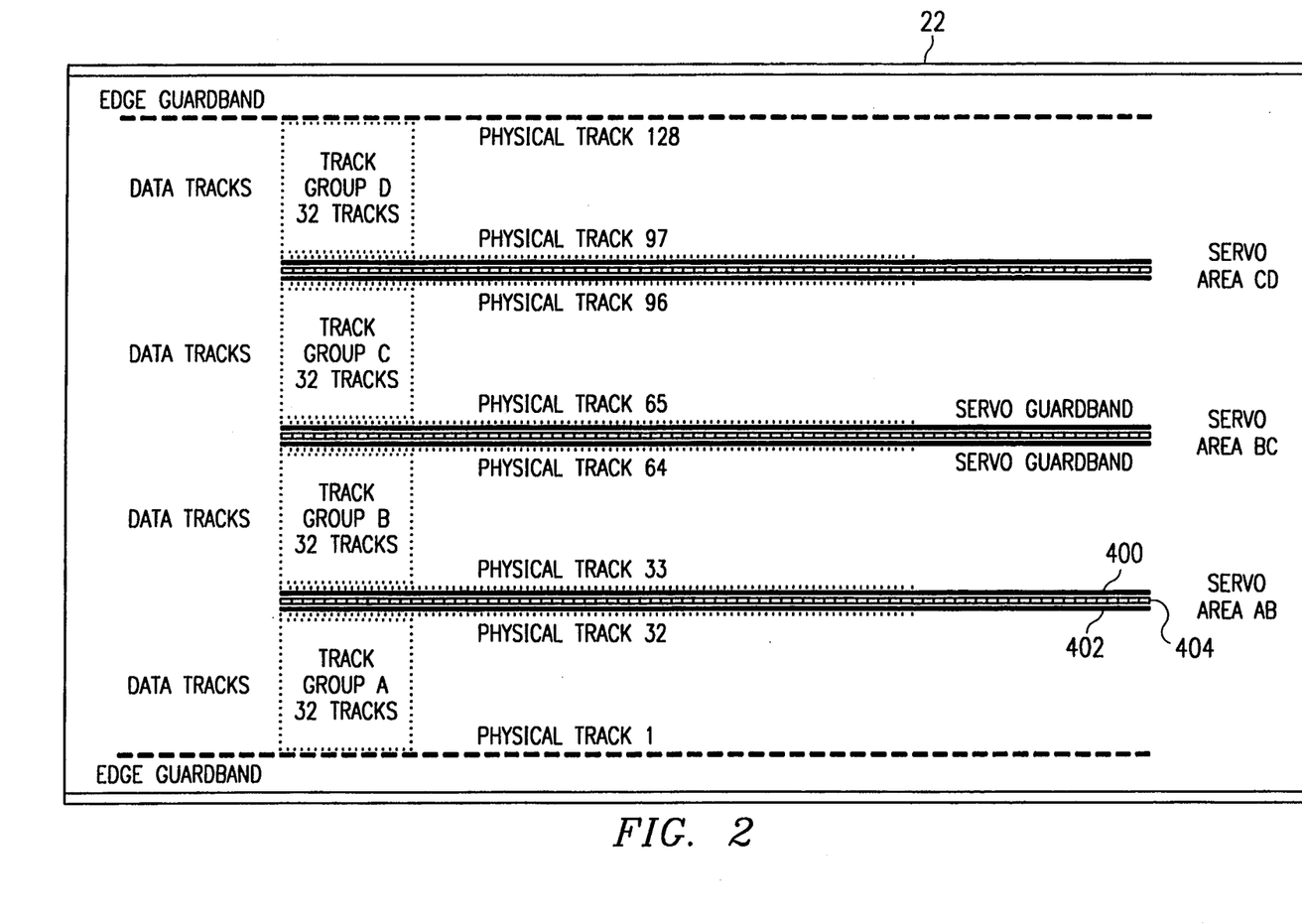
FIG. 2 illustrates a magnetic tape format employable with the present invention.
Figure 3:
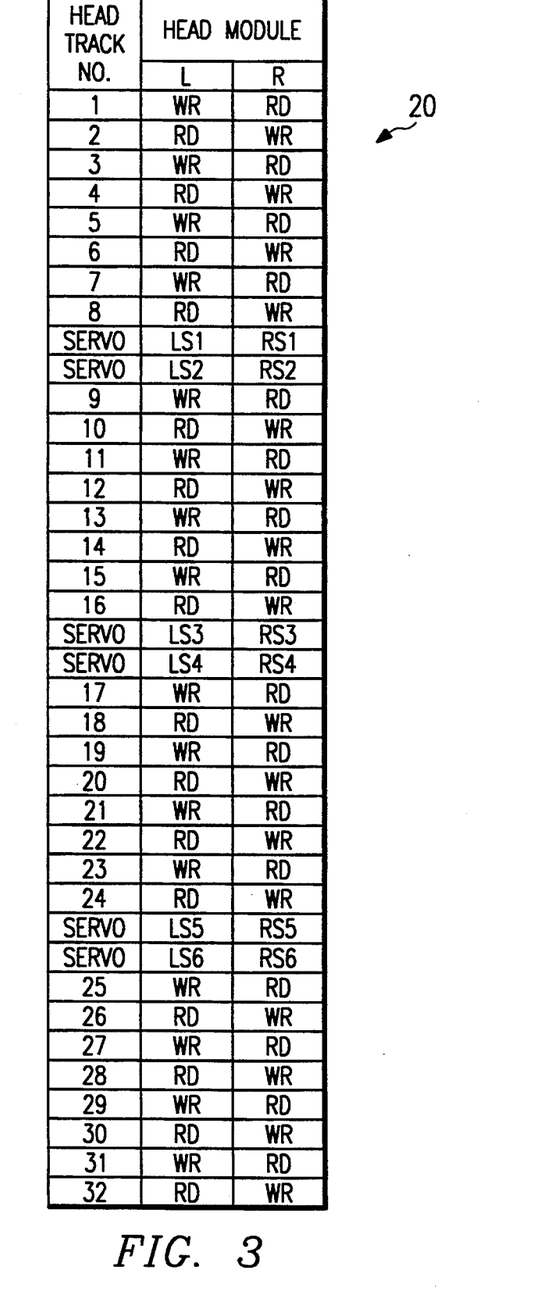
FIG. 3 illustrates the configuration of data and servo elements on a magnetic tape transducer used to access the tape of FIG. 2.

Depending upon the index position desired and the direction of the tape, different sets of read/write elements are enabled by a read/write gap select device 30 and different groups of servo elements are enabled by a servo gap select device 32, both under the direction of the control unit 12. FIG. 2 illustrates a format of the magnetic tape 22 having four data track groups A, B, C and D, of thirty-two parallel data tracks each, and three parallel servo areas AB, BC and CD symmetrically spaced across the tape width between the four data track groups A–D. The data track groups A–D and the servo areas AB, BC and CD extend longitudinally the length of the tape 22. Guard bands are situated between the tape edges and the first and last data tracks and between the boundaries of each servo area AB, BC and CD and adjacent data tracks. As shown in more detail in FIG. 4, each servo area includes two outer tracks 400 and 402, having a recorded servo pattern of one frequency, on either side of a middle track 404, having a different recorded servo pattern of a second frequency. FIG. 3 illustrates an element configuration of the transducer 20 operable with the 128 track tape 22 illustrated in FIG. 2. The length of the transducer 20 substantially corresponds to the width of the tape 22; the transducer 20 includes thirty-two read/write element pairs and three sets of servo read elements corresponding to the three servo areas AB, BC and CD. The transducer includes left and right modules separately fabricated, then bonded together. Write and read elements alternate transversely down the length of each module (that is, across the width of the tape), beginning with a write element in position one on the left module and a read element in the corresponding position one on the right module. Thus, each write element in the left module is paired with a read element in the corresponding position on the right module and each read element in the left module is paired with a write element in the corresponding position on the right module such that write-/read element pairs alternate transversely with read/-write element pairs.

Between data element positions 8 and 9, 16 and 17, and 24 and 25 are located two left and right pairs of servo read elements, identified as LS1 and RS1, LS2 and RS2, LS3 and RS3, LS4 and RS4, LS5 and RS5, and LS6 and RS6. For purposes of further identification, servo pairs 1, 3 and 5 are in an upper group while pairs 2, 4 and 6 are in a lower group.

In operation, as the tape 22 travels past the transducer 20 in one direction, forward, for example, the control unit 12 directs the index controller 26 to position the transducer 20 in a first desired index position. The sixteen odd-numbered data read/write element pairs are enabled and access data tracks 2, 10, 18, . . . , 114 and 122. The tape direction is reversed for a second pass, the first index position is maintained, and the sixteen even-numbered data elements are enabled to access data tracks 6, 14, 22, . . . , 118 and 126. For a third pass, the head is indexed to the next position, the tape moved forward, and the odd data elements enabled to access data tracks 3, 11, 19, . . . , 115 and 123. The entire tape can be accessed in such a fashion, sixteen tracks at a time, with a total of four index positions and eight passes, four in each direction.

Figure 4:
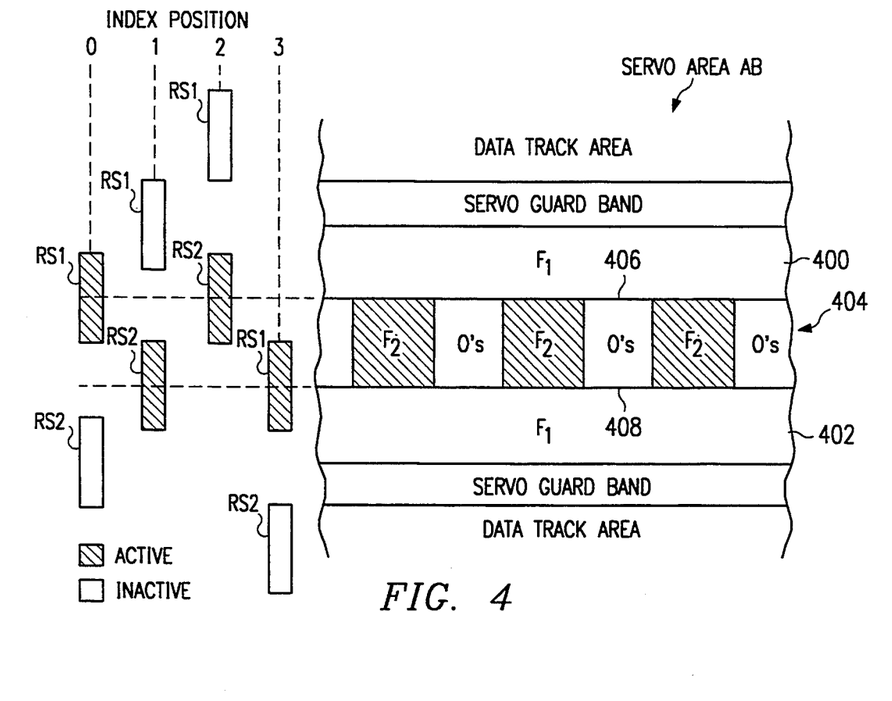
FIG. 4 illustrates servo elements of the transducer of FIG. 3 in various index positions to access data from the tape of FIG. 2.

During tracking, the control unit 12 directs the servo gap select device 32 to activate the upper or lower group of servo elements on the left or right module, depending upon the tape direction and the selected index position. FIG. 4 illustrates servo elements RS1 and RS2, of the upper and lower servo groups, respectively, on the right module of the transducer 20 in each of the four index positions of the transducer 20. For purposes of this illustration, the corresponding servo elements LS1 and LS2 on the left module are not shown. The active or selected element (upper or lower), shown with shading, is aligned with an upper edge 406 or lower edge 408 between the inner track 404 and an outer track 400 or 402 of the servo area AB.

The outer servo tracks 400 and 402 of the servo area AB are recorded with a signal F1, such as a sine wave, having a constant frequency $f_1$ and an amplitude of $A(\sin 2\pi f_1 t)$, where A is the maximum amplitude. The inner servo track 404 is recorded with a repetitive pattern in which another signal F2, having a different constant frequency $f_2$ and an amplitude of $B(\sin 2\pi f_2 t)$ (where B is the maximum amplitude), alternates with a portion having zero amplitude (also referred to as a null portion). $f_1$ can be, for example, 1.67 MHz and $f_2$ can be 1.25 MHz.

Figure 7:
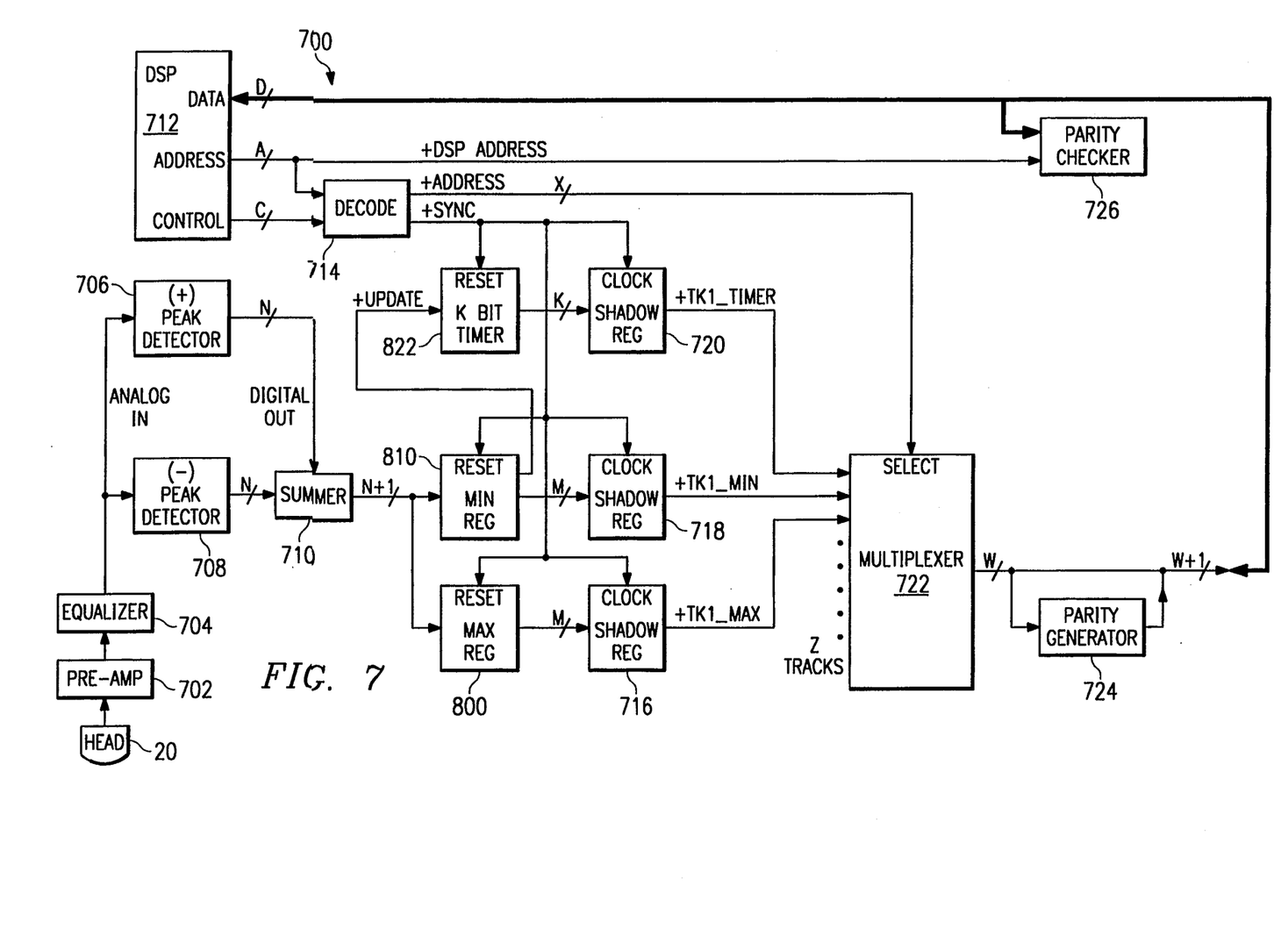
FIG. 7 is a block diagram of a servo module of the present invention.

To accomplish precise servo positioning of the transducer 20, the present invention provides a servo processing module 700, as shown in the block diagram of FIG. 7, within the position error detection controller 28 and interconnected with the transducer 20 through the servo gap select device 32. In the exemplary tape drive 10 illustrated in FIG. 1 and described herein, 128 data tracks are accessed, sixteen at a time. Four processing modules are interconnected with the transducer 20 and each can concurrently process data from four data tracks from one of the data areas A-D. A fifth module 700 can concurrently process servo information from the three servo areas AB, BC and CD. Each of the five modules can be of the same internal design and be capable of processing the same number channels of information (such as four). In the illustrated drive 10 having three servo channels, one channel of the servo module 700 is disabled. Consequently, design, production and problem analysis costs are reduced. The module 700 includes a preamplifier 702 and equalizer 704 for initial processing of the analog servo signal from a servo element on the transducer 20, including filtering out low amplitude beat signals. The equalized servo signal is sent to both positive and negative peak detectors 706 and 708 which detect and digitize the peak positive and negative values of the amplitude of the servo signal. The digital outputs of the detectors 706 and 708, each having N bits, are added in a summer 710 which outputs an N+1=M bit data signal to maximum and minimum register modules 800 and 810. The foregoing signal detection is described and claimed in related co-assigned U.S. application Ser. No. 08/087,035 entitled DIGITAL PEAK THRESHOLD TRACKING METHOD AND APPARATUS by Bailey, et al.

Figure 8A:
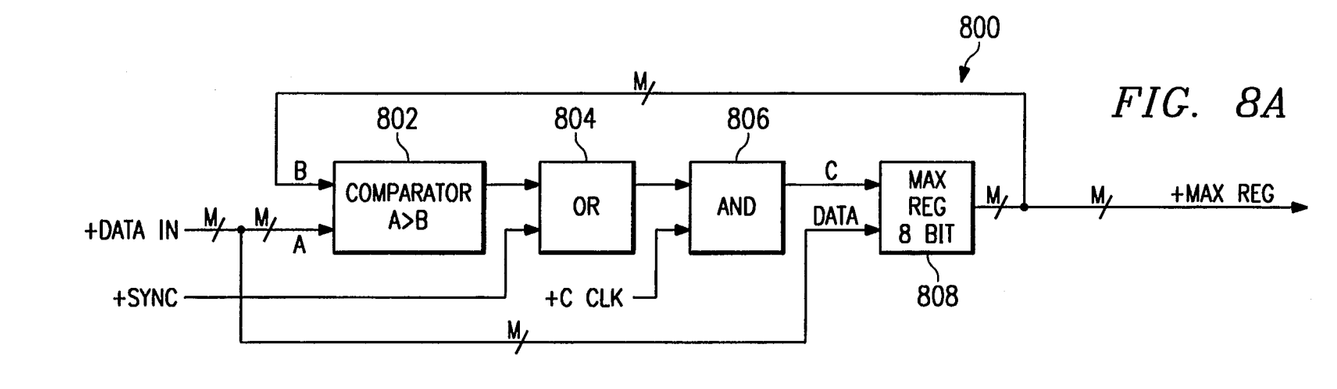
FIGS. 8A and 8B illustrate the maximum and minimum register logic, respectively, of a servo module of the present invention.
Figure 8B:
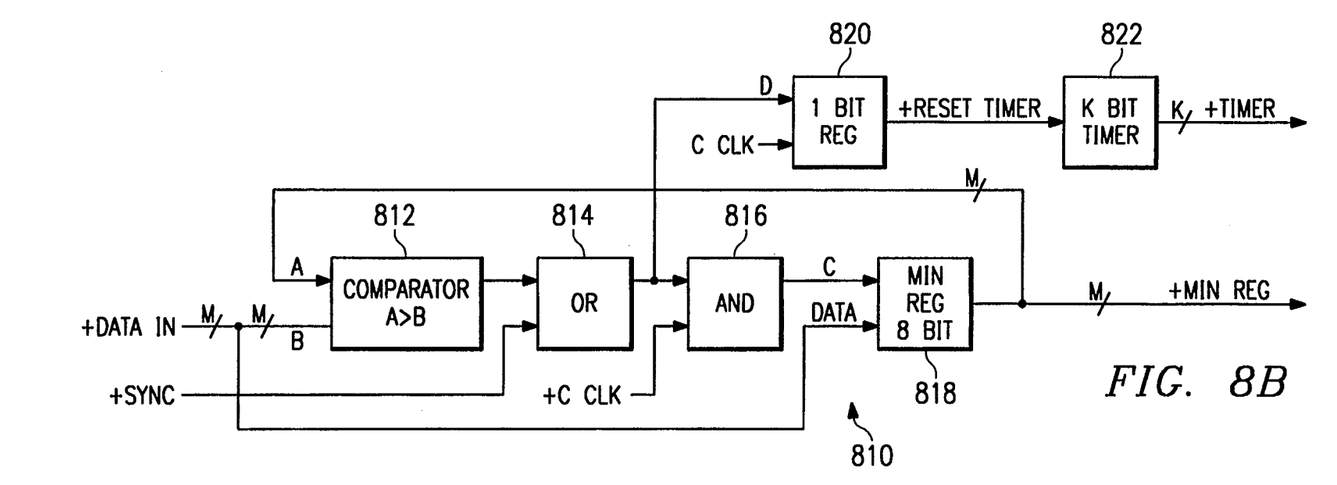

FIGS. 8A and 8B respectively illustrate an embodiment of the maximum and minimum register modules 800 and 810. The maximum register module 800 includes a comparator 802 having two N+1=M bit data inputs, one of which receives the output from the summer 710. One input of an OR gate 804 receives the output of the comparator 802 while the other input receives a resetting SYNCH signal from a decoder 714. The output of the OR gate 804 is transmitted to an AND gate 806 where it is ANDed with a clock signal CLK. A register 808 receives the output of the AND gate 806 as a control signal; a data input receives the output of the summer 710 when enabled by CLK. The output of the register 808 is transmitted to the second data input of the comparator 802 for comparison with the summer 710 output.

Upon receiving the SYNCH and CLK signals, the register 808 is loaded with the summer 710 output. This initial value is then compared by the comparator 802 with a new value of the summer 710 output. If the new value is less than the initial value, the outputs of both the OR and AND gates 804 and 806 are 0 and the contents of the register 808 remain unchanged. If, however, the new value from the summer 710 is greater than the initial value, then the comparator 802, the OR gate 804 and the AND gate 806 each output a 1 causing the new value to be loaded into the register 808. Thus, the maximum register module 800 holds the value representing the maximum peak-to-peak value of the amplitude of the servo signal from the associated transducer 20 servo element during a defined period of time.

Similarly, the minimum register module 810 includes a comparator 812, an OR gate 814, an AND gate 816, and a register 818. After the same period of time, therefore, the minimum register module 802 holds the value representing the minimum peak-to-peak value of the amplitude of the servo signal. The minimum register module 810 also includes a one-bit delay register 820, interconnected to receive the CLK signal and the output of the OR gate 814, and a K-bit timer 822 enabled by the 1-bit register 820. The timer 822 is reset one CLK pulse after each new value is loaded into the minimum register 818 and indicates the age of the contents of the minimum register 818.

Figure 5:
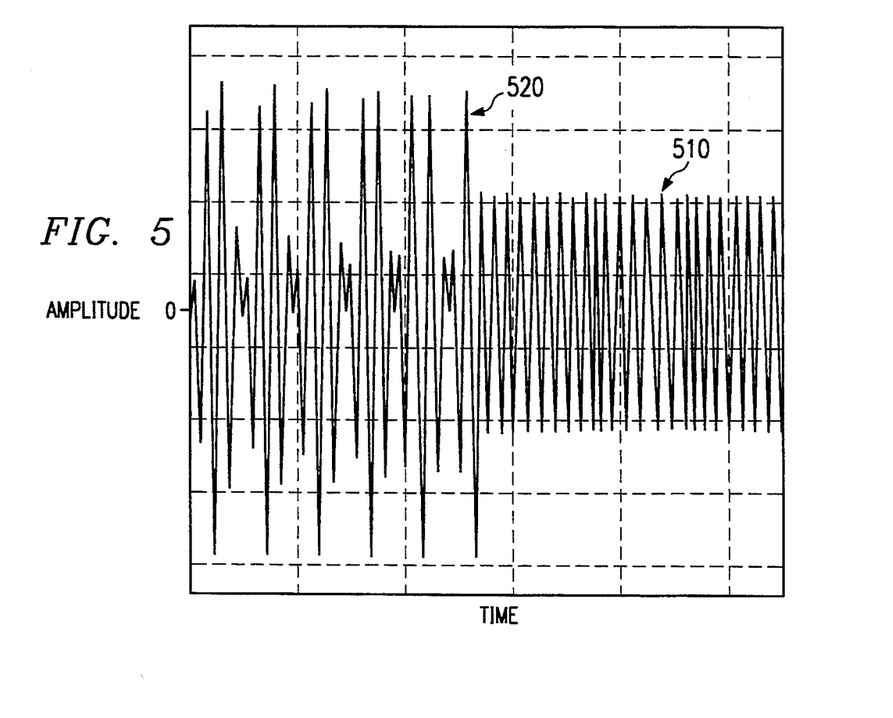
FIG. 5 illustrates an exemplary servo signal generated by a servo element.

FIG. 5 is an amplitude vs time plot of an exemplary servo signal generated by an active element which is exactly centered on a selected edge 406 or 408 between the inner servo track 404 and either of the outer servo tracks 400 or 402. The portion on the right of the plot, generally indicated by the arrow 510, is representative of the signal F1+(F2=0) generated by the active element when the null portion of the inner track 404 passes the element. The portion on the left of the plot, generally indicated by the arrow 520 is representative of the signal F1+F2 generated by the active element when the F2 portion of the inner track 404 passes the element.

The amplitudes of the two separate signals F1 and F2 are proportional to the area of the servo element covering the respective outer and inner tracks. An automatic gain control normalizes the signal such that the area covering the outer track plus the area covering the inner track equals 1 (100%), then $A+B=1$ and the instantaneous amplitude of the servo signal generated by the servo element equals $A(\sin 2\pi f_1 t)+(1-A)(-\sin 2\pi f_2 t)$.

Figure 6A:
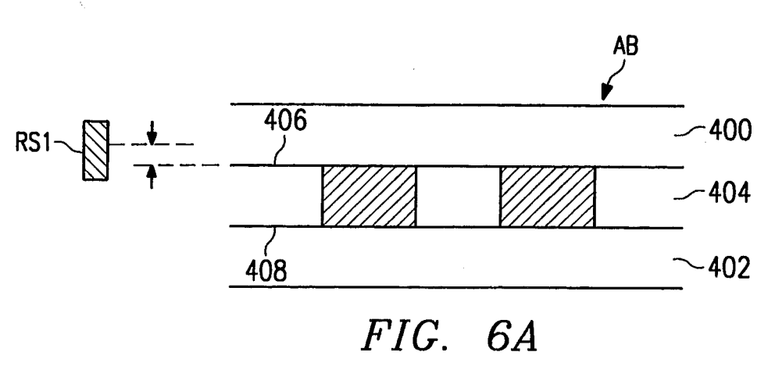
FIGS. 6A–6D illustrate off-center tracking of the transducer of FIG. 3 and resulting servo signal plots.
Figure 6B:
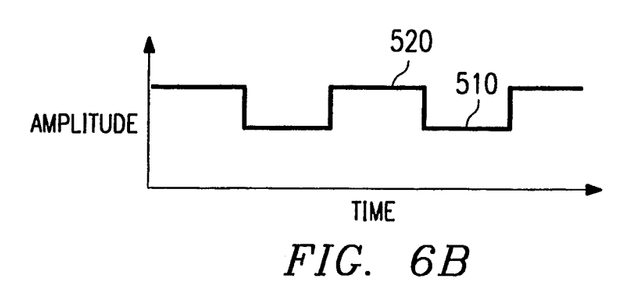
Figure 6C:
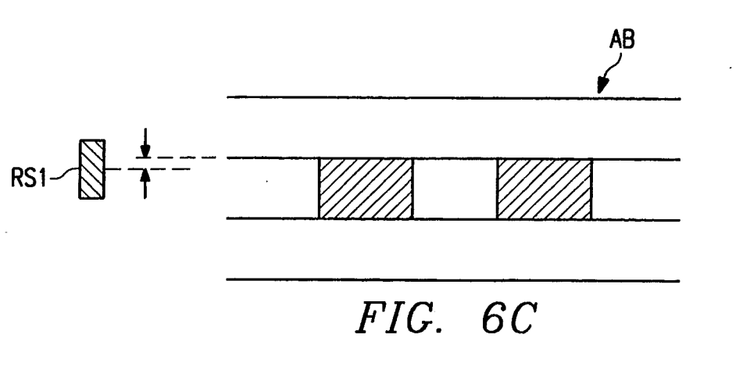
Figure 6D:
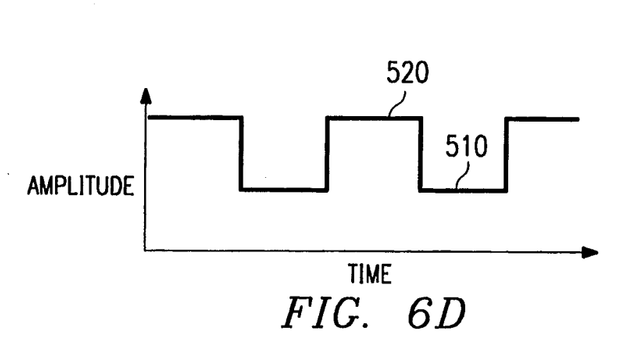

FIGS. 6A–6D illustrate how the relative position of a servo element RS1 affects the resulting servo signal. For clarity, only the outer envelope of the servo signal is shown. When, as shown in FIG. 6A, the servo element RS1 covers more of the outer servo track 400 or 402 than the inner track 404, the amplitude ratio of the F1 to F1+F2 increases, as shown in FIG. 6B. Conversely, when the servo element RS1 covers more of the inner track 404 than the outer servo track 400 or 402, the amplitude ratio of the F1 to F1+F2 decreases. In both situations, the amplitude of the F1+F2 portion 520 remains substantially constant. Therefore, the ratio between the amplitudes of the F1 only and the F1+F2 portions represents the magnitude and direction of any positioning error of the servo element relative to the servo edge (and, relatedly, of any position error of data elements relative to data tracks). The present invention employs the ratio in generating a position error signal (PES).

Referring again to FIG. 7, a digital signal processor (DSP) 712 periodically (such as every 83 microseconds) issues control and address signals to a decoder 714. In response, the decoder 714 issues the SYNCH signal causing the maximum and minimum register modules 800 and 810 to be initialized to the then current peak-to-peak value of the summer 710 and the timer 822 to be reset to zero. Additionally, the contents of the registers 808 and 818 and the timer 822 are copied into shadow registers 716, 718 and 720, respectively. Until the next SYNCH signal is transmitted, the summer 710 provides current peak-to-peak values to the registers 808 and 818 which are updated when new maximum and minimum peak-to-peak values are detected. At the end of the period, another SYNCH signal is transmitted to cause the final values to be loaded into the shadow registers 716, 718 and 720. Thus, information is latched into the shadow registers 716, 718 and 720 and made available to the DSP 712, freeing the register modules and timer 800, 810 and 822 to be updated with new information in the next period. Notably, the sampling clock of the DSP 712 does not need to be synchronized with the peak detection or the loading of the registers 800 and 810.

After the shadow registers 716–720 have been loaded, the DSP 712 transmits control and address signals to the decoder 714 which, in turn, transmits an address select signal to a multiplexer (MUX) 722. The contents of each of the shadow registers 716–720, as well as of shadow registers connected with the other two servo channels, are sequentially transferred to the DSP 712. To enhance the accuracy of the data transmission from the shadow registers and timer 716–720 to the DSP 712, parity generating and checking devices 724 and 726 are provided.

After the DSP 712 has obtained the maximum and minimum values from the shadow registers 716 and 718, it calculates their ratio to determine any position error. The age of any error is indicated by the value received from the timer shadow register 720. If the age exceeds a predetermined amount, such as one period of the servo signal, the maximum and minimum values are rejected by the DSP 712 as invalid. If the servo element 20 is determined to be off track, the DSP uses the age data to determine the head position error by comparison with stored read positions as a function of time and generates a corrective signal directing the positioning actuator 24 to make appropriate corrective movements. The value in the timer shadow register 720 can also be used to indicate demodulation errors (such as erroneous minimum samples) or to notify the control unit 12 that a head position servo error has occurred.

While the invention has been particularly shown and described with reference to preferred embodiments thereof, it will be understood by those skilled in the art that various changes in form and details may be made therein without departing from the spirit and scope of the invention.

What is claimed is:

1. A multitrack, magnetic tape drive, comprising:
   a transducer having a plurality of elements for accessing tracks of a multitrack magnetic tape, said plurality of elements including a servo element for detecting a multi-frequency servo pattern recorded on a servo area of the tape and generating a servo output signal, the servo area including parallel first and second servo tracks, the servo pattern comprising a first servo signal recorded on the first servo track at a first frequency and a second servo signal recorded on the second servo track having a second frequency alternating with a null portion;
   means for driving the magnetic tape in a path across said plurality of elements;
   means for transmitting signals to and receiving signals from said transducer whereby information is recorded on and read from the magnetic tape;
   a control unit coupled to receive and periodically process the servo output signal generated by said servo element and generate a position error signal, said control unit comprising:

a peak detector coupled to receive the servo output signal from said servo element and to periodically determine a peak-to-peak value of the servo output signal;

a first register having a data input interconnected with an output of said peak detector; and a first comparator having a first input interconnected with said output of said peak detector, a second input interconnected with an output of said first register, and an output interconnected with a control input of said first register, said output providing a first load signal if the value at said output of said peak detector is greater than the value at said output of said first register;

a first shadow register having a data input interconnected with said output of said first register and a control input interconnected with a control output of said signal processor;

a second register having a data input interconnected with said output of said peak detector;

a second comparator having a first input interconnected with said output of said peak detector, a second input interconnected with an output of said second register, and an output interconnected with a control input of said second register, said output providing a second load signal if the value at said output of said peak detector is less than the value at said output of said second register;

a second shadow register having a data input interconnected with said output of said second register and a control input interconnected with said control output of said signal processor;

a timer for measuring an age of contents of said second register, said timer having a reset input interconnected with said output of said second comparator;

a third shadow register having a data input interconnected with an output of said timer and a control input interconnected with said control output of said signal processor;

a signal processor for periodically calculating a ratio between a minimum value and a maximum value of the periodically determined peak-to-peak value of the servo output signal and generating the position error signal based on the ratio and representative of a position of said servo element relative to the first and second servo tracks;

a multiplexer having data inputs interconnected with data outputs of said first, second and third shadow registers, a control input interconnected with said control output of said signal processor and a data output interconnected with a data input of said signal processor; and a decoder interconnected between said control output of said signal processor and said control inputs of said first and second registers, said timer, said first, second and third shadow registers and said multiplexer; and an actuator assembly, responsive to the position error signal, for imparting reciprocating motion to said transducer in a direction transverse to the tape path, wherein, during operation of the tape drive, said control unit attempts to maintain said transducer in a position whereby a first half of said servo element detects the first servo signal and a second half of said servo element detects the second servo signal.

2. An apparatus for generating a position error signal indicative of a position of a magnetic tape head relative to a magnetic tape, comprising:

detecting means for providing a value of a peak-to-peak amplitude of a multi-frequency servo pattern recorded on a magnetic tape;

a first register coupled to receive the peak-to-peak value from said detecting means;

a first comparator coupled to receive the peak-to-peak value from said detecting means and to receive a contents of said first register, said first comparator further coupled to provide a first load signal to said first register if the peak-to-peak value exceeds the contents of said first register;

a first shadow register coupled to receive the contents of said first register upon receipt of a first transfer signal;

a second register coupled to receive the peak-to-peak value from said detecting means;

a second comparator coupled to receive the peak-to-peak value from said detecting means and to receive a contents of said second register, said second comparator further coupled to provide a second load signal to said second register if the peak-to-peak value is less than the contents of said second register;

a second shadow register coupled to receive the contents of said second register upon receipt of a second transfer signal;

a timer coupled to reset and commence timing upon receipt of the second load signal from said second comparator;

a third shadow register coupled to receive a contents of said timer upon receipt of a third transfer signal;

a signal processor coupled to receive the contents of said first, second and third shadow registers upon transmission of fourth, fifth and sixth transfer signals by said signal processor, said signal processor comprising:
means for calculating a ratio between the contents of said second and first shadow registers; and
means for outputting a position error signal based upon the calculated ratio a multiplexer coupled to transmit to said signal processor the contents of one of said first, second and third shadow registers, as selected by said signal processor; and a decoder coupled to receive control signals from said signal processor and transmit the first, second and third transfer signals to said first and second registers and said timer, respectively, and transmit the fourth, fifth and sixth transfer signals to said multiplexer.

3. The apparatus of claim 2, further comprising error detection means interconnected between said multiplexer and said signal processor.

4. An apparatus for generating a signal indicative of a position of a magnetic tape head relative to a magnetic tape, comprising:

means for receiving a periodic servo signal recorded on a magnetic tape;

means for measuring a plurality of peak values during one period of the servo signal;

first storage means for storing a first of said plurality of peak values;

first comparing means for comparing the stored first peak value with a second of said plurality of peak values and for directing that said first storage means store the second peak value if the second peak value exceeds the first peak value wherein, at the end of a period of the servo signal, a maximum value of said plurality of peak values is stored in said first storage means;

second storage means for storing the first of said plurality of peak values;

second comparing means for comparing the stored first peak value with the second of said plurality of peak values and for directing that said second storage means store the second peak value if the second peak value is less than the first peak value wherein, at the end of a period of a servo signal, the minimum value of said plurality of peak values is stored in said second storage means;

means for maintaining time elapsed since said second comparing means last directed said second storage means to store one of said plurality of peak values;

means for calculating a ratio between the detected minimum value and the detected maximum value and generating a signal based thereon indicating a position of the tape head relative to the tape;

third, fourth and fifth storage means coupled respectively to receive contents of said first and second storage means and said time maintaining means upon a first command by said calculating means; and a multiplexer interconnected to transmit to said calculating means contents of a selected one of said third, fourth and fifth storage means upon a second command from said calculating means.

5. The apparatus of claim 4, wherein said calculating means comprises a signal processor coupled to receive the contents of said third, fourth and fifth storage means upon a third command by said signal processor.

6. The apparatus of claim 15, wherein said calculating means comprises a signal processor coupled to selectively receive the contents of said third, fourth and fifth storage means upon receipt by said multiplexer of fourth, fifth and sixth commands by said signal processor.

7. The apparatus of claim 4, wherein said measuring means comprises:

means for measuring a first absolute value of a positive peak value of the servo signal;

means for measuring a second absolute value of a corresponding negative peak value of the servo signal; and means for adding the first and second absolute values to obtain a peak-to-peak value, said first and second detecting means detecting a maximum and a minimum peak-to-peak value, respectively, of the servo signal.

* * * * *